US012793308B2

(12) United States Patent
Seol et al.

(10) Patent No.: US 12,793,308 B2
(45) Date of Patent: Nov. 10, 2026

(54) AUDIO-DRIVEN FACIAL ANIMATION SUPPORTING VARYING IDENTITIES AND SPEAKING STYLES

(71) Applicant: NVIDIA Corporation, Santa Clara, CA (US)

(72) Inventors: Yeongho Seol, Seoul (KR); Zhengyu Huang, Shanghai (CN); Roger Blanco Ribera, Seongnam-si (KR); Dmitry Korobchenko, London (GB)

(73) Assignee: NVIDIA Corporation, Santa Clara, CA (US)

( * ) Notice: Subject to any disclaimer, the term of this patent is extended or adjusted under 35 U.S.C. 154(b) by 188 days.

(21) Appl. No.: 18/917,641

(22) Filed: Oct. 16, 2024

(65) Prior Publication Data

US 2026/0105671 A1 Apr. 16, 2026

(30) Foreign Application Priority Data

Oct. 11, 2024 (CN) ......................... 202411418938.5

(51) Int. Cl.

| | |
|---|---|
| ***G06T 13/20*** | (2011.01) |
| ***G06N 3/0475*** | (2023.01) |
| ***G06T 13/40*** | (2011.01) |
| ***G06T 17/20*** | (2006.01) |

(52) U.S. Cl.

CPC ......... *G06T 13/205* (2013.01); *G06N 3/0475* (2023.01); *G06T 13/40* (2013.01); *G06T 17/205* (2013.01); *G06T 2200/24* (2013.01)

(58) Field of Classification Search

CPC ..... G06T 13/205; G06T 13/40; G06T 17/205; G06T 2200/24; G06N 3/0475

See application file for complete search history.

(56) References Cited

U.S. PATENT DOCUMENTS

| | | | | |
|---|---|---|---|---|
| 10,535,163 | B2 * | 1/2020 | Li | G06N 3/045 |
| 10,817,708 | B2 * | 10/2020 | Wang | G06V 20/40 |
| 10,990,804 | B2 * | 4/2021 | Hu | G06T 3/18 |
| 11,488,418 | B2 | 11/2022 | Iqbal et al. | |
| 11,620,521 | B2 | 4/2023 | Karras et al. | |
| 11,748,845 | B2 | 9/2023 | Zingade et al. | |

(Continued)

FOREIGN PATENT DOCUMENTS

EP 3 754 611 A1 12/2020

OTHER PUBLICATIONS

Cudeiro, Daniel, et al. "Capture, learning, and synthesis of 3D speaking styles." Proceedings of the IEEE/CVF conference on computer vision and pattern recognition. 2019. (Year: 2019).

(Continued)

*Primary Examiner* — Terrell M Robinson

(74) *Attorney, Agent, or Firm* — Foley & Lardner LLP

(57) ABSTRACT

In various examples, systems and methods are disclosed relating to animating virtual or digital actors or avatars using audio-driven animation. A system can identify an animation for a mesh corresponding to audio data and an indication of a speaking style. The system can generate a plurality of vertex deltas using the animation and a neutral pose for the mesh. The system can update, using the plurality of vertex deltas, the audio data, and the indication of the speaking style, a machine-learning model to generate output vertex deltas for the mesh given an input speaking style and input audio data.

20 Claims, 9 Drawing Sheets

500

(56) References Cited

U.S. PATENT DOCUMENTS

| | | | | |
|---|---|---|---|---|
| 11,861,890 | B2 | 1/2024 | Karras et al. | |
| 12,175,703 | B2 | 12/2024 | Birchfield et al. | |
| 12,406,419 | B1 | 9/2025 | Villanueva Aylagas et al. | |
| 12,592,018 | B1 | 3/2026 | Villanueva Aylagas et al. | |
| 2016/0078280 | A1 * | 3/2016 | Tai | G06V 40/162 382/118 |
| 2017/0243387 | A1 * | 8/2017 | Li | G06V 20/46 |
| 2021/0233299 | A1 | 7/2021 | Zhou et al. | |
| 2021/0287430 | A1 | 9/2021 | Li et al. | |
| 2021/0327117 | A1 * | 10/2021 | Krokhalev | G06T 13/40 |
| 2021/0358164 | A1 | 11/2021 | Liu et al. | |
| 2022/0068007 | A1 * | 3/2022 | Lafer | G06T 7/50 |
| 2022/0392131 | A1 | 12/2022 | Li et al. | |
| 2023/0123486 | A1 | 4/2023 | Del Val Santos et al. | |
| 2023/0351662 | A1 | 11/2023 | Sinha et al. | |
| 2024/0144001 | A1 | 5/2024 | Karras et al. | |
| 2024/0257431 | A1 | 8/2024 | Moser | |
| 2025/0045996 | A1 | 2/2025 | Lebaredian et al. | |

OTHER PUBLICATIONS

Fu, Hui, et al. "Mimic: Speaking style disentanglement for speech-driven 3d facial animation." Proceedings of the AAAI conference on artificial intelligence. vol. 38. No. 2. 2024. (Year: 2024).

Thambiraja, Balamurugan, et al. "Imitator: Personalized speech-driven 3d facial animation." Proceedings of the IEEE/CVF international conference on computer vision. 2023. (Year: 2023).

* cited by examiner

AUDIO-DRIVEN FACIAL ANIMATION SUPPORTING VARYING IDENTITIES AND SPEAKING STYLES

CROSS-REFERENCE TO RELATED APPLICATIONS

The present application claims the benefit of and priority to Chinese Patent Application No. 202411418938.5, filed Oct. 11, 2024, the disclosure of which is incorporated herein by reference in its entirety.

BACKGROUND

Speech or utterances detected in audio data can be used to generate corresponding animations for three-dimensional meshes. However, conventional approaches for creating accurate lip-synchronization between audio data and mesh data are resource intensive and computationally inefficient. Moreover, such approaches cannot discern or map different styles of speaking without impractical computational burdens.

SUMMARY

Embodiments of the present disclosure relate to audio-driven facial animation techniques supporting varying identities and speaking styles. The systems and methods described herein improve upon conventional facial animation systems by automatically generating animations for different speaking styles and/or identities without requiring computationally impractical machine-learning or data gathering techniques. Unlike conventional approaches, which implement and train/update models to generate facial animations for input audio data from a single actor or speaking style, the techniques described herein provide machine-learning techniques that allow for generation of animations having multiple speaking styles using a single model. The machine-learning techniques described herein can be used to blend different styles and/or identities using a single machine-learning model, resulting in improved computational efficiency to generate animations synchronized with audio data.

At least one aspect relates to one or more processors. The one or more processors can include one or more circuits. The one or more circuits can identify an animation for a mesh corresponding to audio data and an indication of a speaking style. The one or more circuits can generate a plurality of vertex deltas using the animation and a neutral pose for the mesh. The one or more circuits can update, using the plurality of vertex deltas, the audio data, and the indication of the speaking style, one or more parameters of a machine-learning model such that the machine-learning model generates output vertex deltas for the mesh given an input speaking style and input audio data.

In some implementations, the one or more circuits can generate the plurality of vertex deltas based at least on respective vertices in the mesh at a frame of the animation and corresponding vertices of the neutral pose for the mesh. In some implementations, the one or more circuits can generate a style vector based at least on the indication of the speaking style. In some implementations, the one or more circuits can update the one or more parameters machine-learning model based at least on the style vector. In some implementations, the one or more circuits can execute the machine-learning model using second audio data and a second indication of a second speaking style to generate a set of vertex deltas for the mesh.

In some implementations, the machine-learning model comprises a first layer and a second layer. In some implementations, the one or more circuits can provide the second audio data as input to the first layer. In some implementations, the one or more circuits can provide a second style vector generated from the second indication of the second speaking style as input to the second layer. In some implementations, the one or more circuits can modify the mesh according to the set of vertex deltas to generate a transformed mesh that conforms to the second audio data.

In some implementations, the mesh is a first mesh corresponding to a first identity. In some implementations, the one or more circuits can generate a blended mesh based at least on the first mesh, a second mesh corresponding to a second identity, and the indication of the speaking style. In some implementations, the indication of the speaking style comprises a first weight value for the first identity and a second weight value of the second identity. In some implementations, the one or more circuits can generate the blended mesh further based at least on the first weight value and the second weight value. In some implementations, the one or more circuits can generate encoded data representing the plurality of vertex deltas. In some implementations, the one or more circuits can update the machine-learning model further based at least on the encoded data.

At least one aspect relates to a system. The system can include one or more processors. The system can calculate a plurality of vertex deltas for a first mesh based at least on an animation of the first mesh and a neutral pose for the first mesh, the animation corresponding to audio data and a style vector. The system can map the plurality of vertex deltas to a second mesh to generate a plurality of mapped vertex deltas. The system can update a machine-learning model using the audio data, the style vector, and the plurality of mapped vertex deltas, one or more parameters of the machine-learning model to generate output vertex deltas for the second mesh given an input style vector and input audio data.

In some implementations, the system can generate a plurality of mapped vertex deltas by generating an updated second mesh by mapping the plurality of vertex deltas to the second mesh; and generating the plurality of mapped vertex deltas by mapping the updated second mesh from a neutral pose of the second mesh. In some implementations, the system can generate the updated second mesh further based at least on a thin plat spline (TPS) function.

In some implementations, the system can generate the updated second mesh further based at least on a delta mush operation. In some implementations, the system can generate an encoded data structure from the plurality of vertex deltas. In some implementations, the system can update the machine-learning model using the encoded data structure. In some implementations, the machine-learning model comprises one or more neural network layers.

At least one aspect is related to a method. The method can include identifying, using one or more processors, an animation for a mesh corresponding to audio data and an indication of a speaking style. The method can include generating, using the one or more processors, a plurality of vertex deltas using the animation and a neutral pose for the mesh. The method can include updating, using the one or more processors and based at least on the plurality of vertex deltas, the audio data, and the indication of the speaking style, one or more parameters of a machine-learning model to generate output vertex deltas for the mesh given an input speaking style and input audio data.

In some implementations, the method can include generating, using the one or more processors, the plurality of vertex deltas based at least on respective vertices in the mesh at a frame of the animation and corresponding vertices of the neutral pose for the mesh. In some implementations, the method can include generating, using the one or more processors, a style vector based at least on the indication of the speaking style. In some implementations, the method can include updating, using the one or more processors, the machine-learning model based at least on the style vector.

Yet another aspect is related to another processor. The processor can include one or more circuits. The one or more circuits can identify an indication of a speaking style for an animation of a mesh. The one or more circuits can generate a configuration input for a machine-learning model based at least on the indication of the speaking style. The one or more circuits can generate, using the machine-learning model and based at least on the configuration input and input audio data, a set of vertex deltas corresponding to the animation of the mesh, the animation synchronized at least in part with the input audio data.

In some implementations, the one or more circuits can generate a style vector for the configuration input using the indication of the speaking style. In some implementations, the one or more circuits can receive the indication of the speaking style in response to an interaction with a graphical element of a graphical user interface. In some implementations, the one or more circuits can generate a transformed mesh corresponding to at least one frame of the animation by applying the set of vertex deltas to the mesh.

In some implementations, the mesh is a blended mesh. In some implementations, the one or more circuits can generate the blended mesh based at least on a first mesh corresponding to a first identity and a second mesh corresponding to a second identity. In some implementations, the indication of the speaking style comprises a first weight value for the first identity and a second weight value of the second identity. In some implementations, the one or more circuits can generate the blended mesh further based at least on the first weight value and the second weight value. In some implementations, the one or more circuits can generate a plurality of sets of vertex deltas for a plurality of frames of the animation using the machine-learning model and based at least on the configuration input and respective windows of the input audio data. In some implementations, the one or more circuits can generate the set of vertex deltas by decoding an output of the machine-learning model.

Another aspect is related to another system. The system can include one or more processors. The system can receive, in response to input to a graphical user interface, an indication of a speaking style for animating a facial mesh. The system can provide the indication of the speaking style and audio data as input to a machine-learning model to generate a set of vertex deltas for the facial mesh. The system can generate at least one frame of an animation using the set of vertex deltas and the facial mesh.

In some implementations, the system can generate the facial mesh based at least on a blend of at least two facial meshes according to the indication of the speaking style. In some implementations, the system can receive the indication of the speaking style in response to a slider input at the graphical user interface. In some implementations, the system can provide the audio data as input according to a sliding window. In some implementations, the system can generate the animation of the facial mesh to synchronize with the audio data.

In some implementations, the system can present the animation of the facial mesh via the graphical user interface. In some implementations, the machine-learning layer comprises a set of multilayer perceptron layers and a set of decoder layers. In some implementations, the system can provide the indication of the speaking style as input to the set of multilayer perceptron layers. In some implementations, the system can provide the audio data as input to the set of decoder layers. In some implementations, the system can generate the set of vertex deltas by decoding an output of the machine-learning model.

The processors, systems, and/or methods described herein can be implemented by or included in at least one of a control system for an autonomous or semi-autonomous machine, a perception system for an autonomous or semi-autonomous machine, a system for performing simulation operations, a system for performing digital twin operations, a system for performing light transport simulation, a system for performing collaborative content creation for 3D assets, a system for performing deep learning operations, a system for performing generative AI operations using a large language model (LLM), a system for performing generative AI operations using a vision-based learning model (VLM), a system implemented using an edge device, a system implemented using a robot, a system for performing conversational AI operations, a system for generating synthetic data, a system incorporating one or more virtual machines (VMs), a system implemented at least partially in a data center, or a system implemented at least partially using cloud computing resources.

BRIEF DESCRIPTION OF THE DRAWINGS

The present systems and methods for audio-driven facial animation supporting varying identities and speaking styles are described in detail below with reference to the attached drawing figures, wherein.

DETAILED DESCRIPTION

Figure 1:
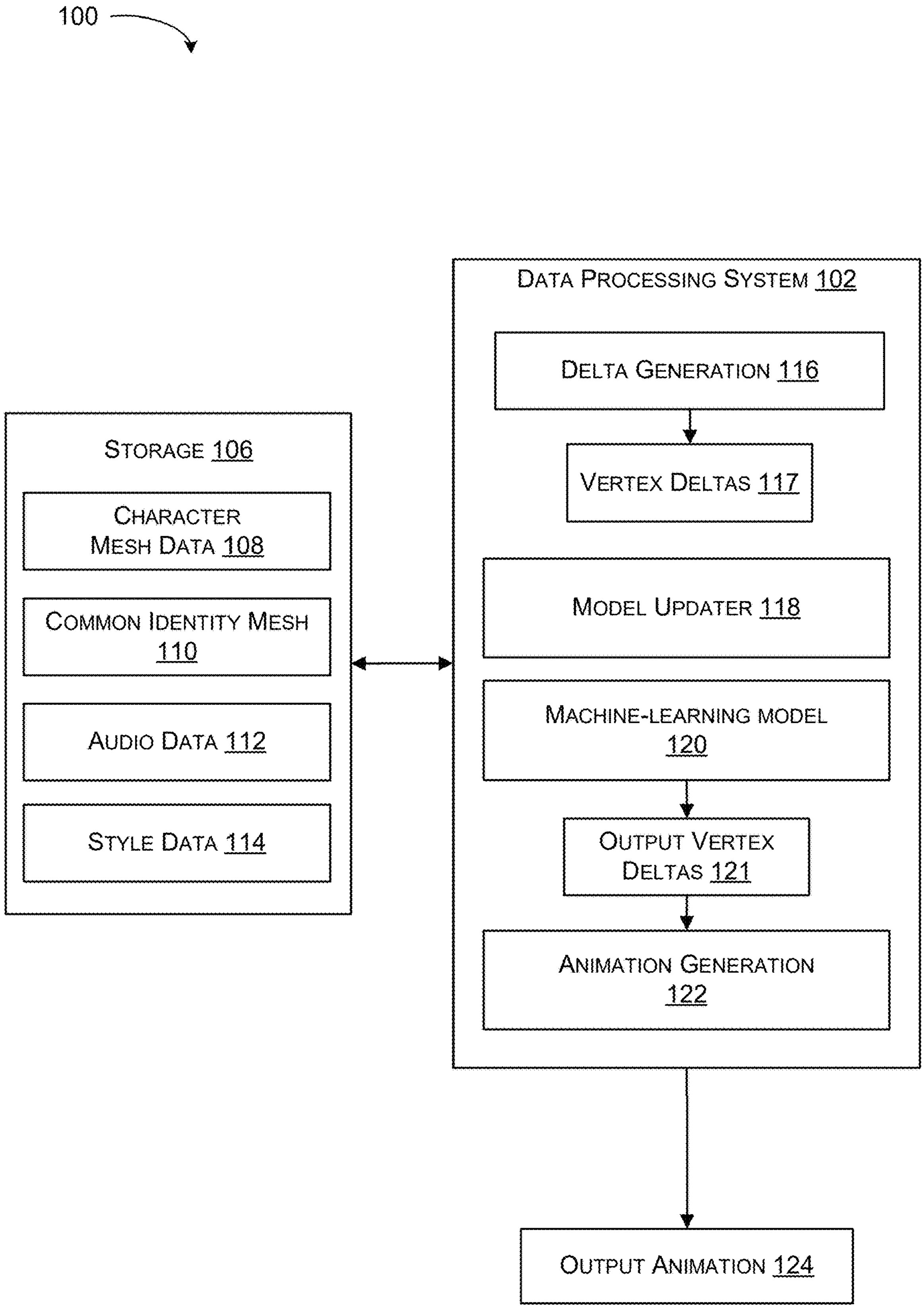
FIG. 1 is a block diagram of an example system for audio-driven facial animation to implement varying identities and speaking styles, in accordance with some embodiments of the present disclosure.

This disclosure relates to systems and methods for audio-driven facial animations supporting varying identities and speaking styles. Using machine learning models, facial animations can be automatically generated for meshes or other surface representations representing animated entities. Such machine-learning models can be trained/updated to receive audio data, such as audio data including human speech, and can generate corresponding mesh deformations (e.g., vertex deltas) as time-series outputs. When these time-series mesh deformations are applied to a mesh of an entity (e.g., a human character, etc.), a facial animation is formed that is synchronized with the input audio data. The machine-learning models can be trained/updated using ground truth scan data from actual human actors to achieve different emotions, expressions, and/or styles of output.

However, conventional approaches for animating entity meshes from audio inputs require training/updating a machine-learning model that is specific to a particular actor and speaking style. This is because conventional update/training approaches for audio-driven facial animation models use ground truth data from a single actor and cannot generalize to multiple actors or styles. For additional identities to be represented, further update/training data must be collected and used to train/update a separate audio-driven animation model for each actor/speaking style. Such approaches are restrictive and impractical to perform for large numbers of actors and speaking styles.

The systems and methods of the present disclosure address these limitations by providing techniques for updating/training a single audio-driven model that is capable of generating facial animations for multiple identities and/or speaking styles. Rather than relying on multiple models that are each specific to a single speaking style or identity, a single model is used that receives further configuration inputs (e.g., a style vector) that identifies an identity and/or speaking style associated with the audio input. Multiple approaches can be implemented to produce outputs for different identities given a single trained network. Using a single model to generate multiple speaking identities and outputs for given arbitrary input audio data enables blending existing styles to generate diverse, unique outputs.

One approach to update/train a model for multiple speaking styles and/or identities includes implementing multiple speaking styles on different neutral identity meshes. In some implementations, a model can be trained for a particular actor corresponding to a neutral mesh, which can be modified to present different speaking styles given arbitrary audio input and style vector(s). To implement this approach, a set of update/training data can be generated by capturing time-series three-dimensional (3D) mesh data (or other surface representation type data) from a group of actors, which shows at least changes to each actor's face, skin, lower teeth, tongue, and/or eyeballs while speaking a predetermined prompt. Audio from the actor speaking the prompt is recorded, synchronized, and associated with the time-series 3D scans of each actor. A time-series sequence of vertex deltas is produced for each actor as corresponding to the input audio data. The vertex deltas are then processed to conform to the inputs/outputs of the model, and the model is trained/updated using the vertex deltas as ground truth data.

A style vector is associated with the update/training data that identifies the speaking style of each actor. This style vector is used with the audio data as input to the model, which is then trained/updated according to, for example, supervised learning techniques. Iterative training/updates of the model can be performed using data from multiple actors, with different speaking styles (e.g., style vectors) to generalize to different speaking styles for different identities. During inference, a style vector can be provided as input to the model with the audio data to generate animations for different actors.

Another approach to update/train a model for multiple speaking styles and/or identities includes implementing a model trained/updated to generate vertex deltas for a single, common identity mesh, which represent speaking styles when applied to the common identity mesh. The common identity mesh can be a general face mesh representing a generic identity. To implement such techniques, vertex deltas can be calculated for 3D meshes generated from multiple actors, as described herein. A delta transfer process and delta mush operation can be performed to transfer the facial deformations of the specific actor mesh to the common identity mesh.

Style vectors corresponding to the specific actor, as described herein, can be associated with the vertex deltas mapped to the common identity mesh. Vertex deltas between the facial deformations applied to the common identity mesh and a neutral pose of the common identity mesh are calculated and associated with the corresponding audio data and style vectors to generate update/training data for the model. The model is then trained (e.g., one or more parameters of the model are updated) to produce any combination of speaking styles on the common identity mesh, using said vertex deltas as ground truth data. These approaches improve upon conventional facial animation techniques by increasing the variety of possible combinations of styles without requiring excessive training of multiple different machine-learning models for each style.

With reference to FIG. 1, FIG. 1 is an example computing environment including a system for audio-driven facial animation to implement varying identities and speaking styles, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 is shown as including the data processing system 102 and the storage 106. The data processing system 102 can implement the various techniques described herein to train/update a machine-learning model 120 to generate output animations 124 using the audio data 112, the style data 114, and the character meshes 108 and/or the common identity mesh 110. To do so, the data processing system 102 (or the components thereof) can access the storage 106 to retrieve the audio data 112, the style data 114, and the speaker meshes 108 and/or the common identity mesh 110. The storage 106 may be an external server, distributed storage/computing environment (e.g., a cloud storage system), or any other type of storage device or system that is in communication with the data processing system 102. Although shown as external to the data processing system 102, it should be understood that the storage 106 may form a part of, or may otherwise be internal to, the data processing system 102.

The data processing system 102 can train/update the machine-learning model 120 to generate output animations 124 that are synchronized with input audio data 112. For example, the data (e.g., vertex deltas) used to generate output animations 124 can include deformations or motion for different facial structures to synchronize, or "lip sync" a three-dimensional (3D) mesh (or other surface or physical representation) of a face to input audio data 112. The motion or deformation information output by the machine-learning model 120 can realistically represent particular styles of speech generated by a 3D mesh. The 3D mesh to be animated may be one or more of the actor/character meshes in the character mesh data 108 or the common identity mesh 110. Each of the meshes may correspond to an individual character, and when deformed according to the output of the machine-learning model 120, create one or more output animations 124 that cause the corresponding 3D to appear as if it is uttering speech present in the input audio data 112.

Components of 3D meshes (e.g., the character meshes 108, the common identity mesh 110, etc.) deformed or otherwise modified according to the output (e.g., the output vertex deltas 121) of the machine-learning model 120 can include, but are not limited to, a head, jaw, eyeballs, tongue, or skin associated with the 3D mesh. By training/updating the machine-learning model 120 to generate output vertex deltas 121 according to input style data 114, the trained/updated machine-learning model 120 can be used to deform meshes according to a variety of character identities and/or speaking styles. This is an improvement over conventional approaches, which require a separate neural network (and corresponding training/update data) to be trained/updated to generate deformations corresponding to a specific speaking style or character identities.

To update/train the machine-learning model 120, the data processing system 102 can generate a training/update dataset for the machine-learning model 120. The training/update dataset can include input data for the machine-learning model 120 (e.g., audio data 112, input style data 114, in some implementations additional emotion data, etc.) paired with corresponding ground-truth vertex deltas 117, which can be generated using a delta generation process 116. The vertex deltas 117 can include changes/modifications/deformations of vertices in a 3D mesh (e.g., the mesh 108, the common identity mesh 110, etc.). The vertex deltas 117 may be generated as part of a time-series sequence of deformations, in some implementations, which corresponds to a time-series input of the audio data 112, such that the deformations are synchronized with speech or other utterances in the input audio data 112.

To generate vertex deltas 117 for a training/update dataset, the delta generation process 116 can access the storage 106 to retrieve the audio data 112, the style data 114, and the character mesh data 108 and/or the common identity mesh data 110. The storage 106 may be an external server, distributed storage/computing environment (e.g., a cloud storage system), or any other type of storage device or system that is in communication with the data processing system 102. Although shown as external to the data processing system 102, it should be understood that the storage 106 may form a part of, or may otherwise be internal to, the data processing system 102.

As shown, the storage 106 can store character mesh data 108, which may include a time-series animation of a 3D character mesh. The 3D mesh may be animated and synchronized with a corresponding set of audio data 112. The character mesh data 108 can be generated by capturing a collection of speech performances can of one or more actors uttering speech (e.g., specific sentences) with different styles of speech/presentation. The audio from the speech performance can be stored as part of the audio data 112 in association with the corresponding character mesh data 108. The character mesh data 108 may include a 3D mesh of the corresponding actor in a neutral pose, which may be used by the delta generation process 116 to generate the vertex deltas 117 corresponding to the audio data 112.

Generation of the character mesh data 108 can be performed using a data collection process. The data collection process can include a capture of, for example, four-dimensional (4D) data, which can include multi-view 3D image/video capture of the actor over at least a period of time of utterance of the speech during the performance. Captured facial behavior can reconstructed for various physical aspects of the actor, including the facial skin (or such surface) and other articulable or controllable components, elements, or features, such as the teeth, eyeballs, head, and tongue (and/or body features or components, such as limbs, fingers, toes, torso, etc.) of the actor. The reconstruction can provide geometric deformation data in the temporal domain for each separately (or at least somewhat separately) modeled facial (or other bodily) component or region, which is stored as part of the character mesh data 108.

Each set of character mesh data 108 can correspond to a respective actor and/or speaking style and can be stored in association with one or more identifiers reflecting said information. The storage 106 is shown as including the style data 114, which can store data reflecting the identity of the actor as well as any speaking style information (e.g., the speaking style and/or emotion of the actor during the performance). The identity of the actor can include an identifier of the actor. In some implementations, the style data 114 can include a style vector that corresponds to a respective set of character mesh data 108. A style vector can be a multi-dimensional vector defining a space that reflects identifiers of the actors used to generate the training/update dataset. For example, different regions in the multi-dimensional style vector space can correspond to different actors, and the style vector for a given actor can specify a point in the multi-dimensional style vector space that most closely corresponds to said actor. The style vector of the style data 114 may sometimes be referred to herein as an "identity vector," which represents an input to the machine-learning model 120 that defines an identity for the output vertex deltas 121.

In some implementations, the delta generation process 116 can generate vertex deltas 117 for different variations of actor identity, including combined identities that can be represented by blending the meshes of multiple actors in the character mesh data 108. To generate a training dataset for such techniques, the delta generation process 116 can generate ground truth vertex deltas 117 corresponding to input audio data 112 and input style data 114 (e.g., a style vector). To generate the vertex deltas 117 for input audio data 112 and corresponding character mesh data 108, the delta generation process 116 can extract vertex positions of each vertex in a keyframe of the captured animation of the character. The delta generation process 116 can then subtract positions of corresponding vertices of the same 3D character mesh (stored as part of the character mesh data 108 for that character) from the extracted vertex positions of the key-frame to generate a set of deltas for each vertex (the vertex deltas 117).

Each vertex delta 117 for a given keyframe of the character animation reflects a distance that the vertex has moved to produce the keyframe of the animation. The delta generation process 116 can perform these operations for each keyframe in the character animation to generate a respective set of vertex deltas 117 for each keyframe. Each set of vertex deltas 117 can be stored as a sequence, which can be synchronized with the corresponding set of audio data 112 for the performance to which the set of character mesh data 108 corresponds.

In some implementations, the vertex deltas 117 can be compressed/encoded using principal component analysis (PCA). Vertex compression/encoding enables detailed facial meshes, with a large number of vertices (e.g., 65,000 vertices), to be represented by a data structure having a relatively smaller dimension (e.g., 272 feature values). In some implementations, the compress/encode vertex deltas (e.g., stored as PCA weight vectors) can be used the ground truth data in the training/update dataset for the machine-learning model 120. The vertex deltas 117 generated for a given character type can be associated with the corresponding audio data 112 and style data 114 and used as a training/update example for the machine-learning model.

The delta generation process 116 can generate a training/update dataset using character mesh data 108 captured from multiple actors performing different performances (e.g., associated with respective audio data 112). For each actor, the style vector of the style data 114 is set to identify the identity of the actor. Similarly, the PCA compression/encoding process used to generate the compressed/encoded vertex deltas 117 for the facial animations is set to have the same dimensionality as other compressed/encoded vertex deltas 117 produced from different sets of the character mesh data 108. This enables the machine-learning model 120 to be trained to produce mesh deformations for multiple identities, including combinations of identities used to train/update the machine-learning model 120. The degree to which a given identity is represented in the output of the machine-learning model is controlled by the value of the style vector of the style data 114. Further details relating to the generation of multiple-identity animations for speech synchronization are described in connection with FIGS. 3 and 4A.

In some implementations, the delta generation process 116 can generate vertex deltas 117 for a common identity mesh 110. The common identity mesh 110 can be any arbitrary mesh for which actor's performance has not been captured. Rather, the delta generation process 116 can access the common identity mesh 110 to generate synthetic training/update data by mapping the vertex deltas 117 produced from the character mesh data 108 to the common identity mesh 110. The common identity mesh 110 can be, for example, any mesh or 3D model of any arbitrary character. The common identity mesh 110 can have similar facial anatomy (e.g., eyes, nose, mouth) as the meshes stored as part of the character mesh data 108. The common identity mesh 110 can have a neutral pose (e.g., not expressing any particular speaking style or emotion), and can represent any character identity, including non-human characters/models/meshes.

To generate a set of synthetic training/update data for the common identity mesh 110, the delta generation process 116 can access a set/sequence of vertex deltas 117 generated from a performance (e.g., from a set of character mesh data 108 and input audio data), and map said vertex deltas to the common identity mesh 110. Mapping the set of vertex deltas 117 to the common identity mesh 110 can include performing a landmark-based thin plate spine (TPS) warping approach to transfer the vertex deltas 117 generated from the character mesh data 108 to the neutral pose of the common identity mesh. The vertex deltas 117 can be transferred separately, for each keyframe of the animated character mesh 108, resulting in generation of a corresponding set of keyframes from warping the common identity mesh 110. An example representation of warping the common identity mesh 110 is shown in FIG. 2.

Figure 2:
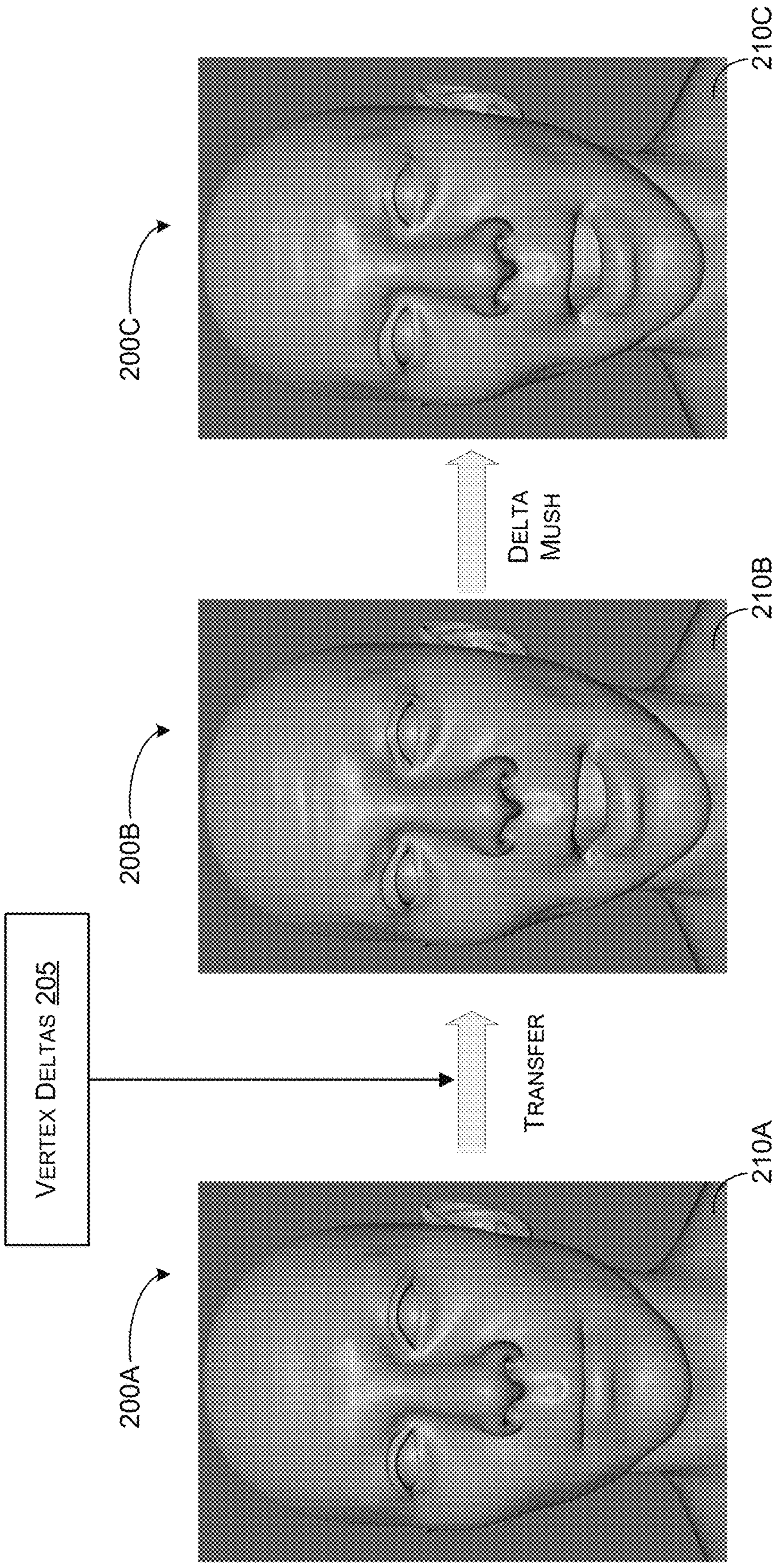
FIG. 2 shows an example flow showing a mapping of vertex deltas to a common identity mesh, in accordance with some embodiments of the present disclosure.

Referring to FIG. 2 in the context of the components described in connection with FIG. 1, depicted is an example diagram indicating how vertex deltas 205 are mapped to a common identity mesh, in accordance with some embodiments of the present disclosure. As shown, at step 200A of the vertex delta mapping process, the common identity mesh 210A (which may be similar to and include any of the structure and/or functionality of the common identity mesh 110 of FIG. 1) is represented in a neutral pose prior to any mapping/transfer operations. As described herein, the common identity mesh 210A can be any suitable character/actor/animatable mesh upon which vertex deltas can be mapped. Although the common identity mesh 210A is shown in this example as representing a generic human face, it should be understood that the common identity mesh 210A may take any suitable appearance with anatomy at least roughly matching that of the vertex deltas to be transferred. For example, the common identity mesh 210A may include a mouth, lips, and/or eyes to be animated according to the techniques described herein.

At step 200B, the common identity mesh 210A has been updated to form the warped common identity mesh 210B. As shown, the vertex deltas 205 (which may be similar to the vertex deltas 117 generated from the character mesh data 108/actor performances as described in connection with FIG. 1) for a particular animation keyframe are transferred to the common identity mesh 210A to generate the warped common identity mesh 210B. Transferring the vertex deltas 205 to the common identity mesh 210A can include performing a combination of linear and non-linear transformations to minimize the energy of surface deformation. For example, the transfer process can be implemented using a TPS transformation process or a variant of radial basis function warping. In some implementations, one or more vertices of the common identity mesh 210A may be selected as landmark vertices, which may correspond to anatomical portions of the common identity mesh 210A (e.g., the edge of eyes, lips, mouth, etc.). The landmarks may be mapped to corresponding target landmark vertices identified in the vertex deltas 205. The landmark vertices in the common identity mesh 210A and/or the vertex deltas 205 may be selected using an automated process or may be specified in labels extracted from the character mesh data 108 and the common identity mesh data 110.

The vertex transfer process used to generate the warped common identity mesh 210B at step 200B may result in artifacts in the warped common identity mesh 210B. The artifacts may include, but are not limited to, folds or edges that are not anatomically correct. In some implementations, a delta mush operation can be performed to filter out deformation artifacts caused by transferring the vertex deltas 205 to the common identity mesh 210A. The delta mush operation can automatically adjust/warp positions of one or more vertices based on the difference between the neutral pose (e.g., the common identity mesh 210A) and the warped common identity mesh 210B. The delta mush operation may include computing the vertex delta between the neutral pose and the warped common identity mesh 210A for each vertex, and performing a smoothing operation (e.g., a Laplacian smoothing operation, any low pass filtering operation, etc.) to generate the smoothed common identity mesh 210C at step 200C. The smoothed common identity mesh 210C, shown as part of step 200C, can be stored and utilized in generation of the synthetic training data for the machine-learning model 120 as described herein.

Referring back to FIG. 1, upon mapping the vertex deltas 117 generated from the character mesh data 108 (e.g., actor performances) onto the common identity mesh 110, the delta generation process 116 can generate a set of common identity vertex deltas 117 by subtracting neutral pose common identity mesh 110 from the smoothed/warped common identity mesh (e.g., the smoothed common identity mesh 210C of FIG. 2). The delta generation process 116 can generate corresponding common identity vertex deltas 117 using the aforementioned techniques for each keyframe of an actor performance/animation (e.g., in the character mesh data 108). Doing so can result in generation of a time-series set of common identity vertex deltas 117 that correspond to input audio data 112 (from an actor performance) and style data 114 (e.g., a style vector indicating the identity of the actor/character mesh data 108 from which the common identity vertex deltas 117 were generated).

In doing so, the delta generation process 116 can generate a set of synthetic training/update data for the common identity mesh 110, with each example include an input sample of audio data 112, input style data 114 indicating the style/identity of the actor that provided the performance for the audio data 112, and ground-truth data including the common identity mesh vertex deltas 117 described above. The delta generation process 116 can encode/compress the common identity vertex deltas 117 using the PCA techniques described herein, such that the encoded/compressed vertex deltas 117 are provided as the ground truth data for each example in the synthetic training/update data. The training/update data generated for the character mesh data 108, and the synthetic training/update data generated using the common identity mesh 110, can be used by the model updater 118 to train/update the machine-learning model 120.

The model updater 118 can use the training/update data (corresponding to the character mesh data 108) and/or the synthetic training/update data (corresponding to the common identity mesh data 110) to train/update the machine-learning model 120. The machine-learning model 120 can include a deep neural network that receives audio data 112 and style data 114 (e.g., a style vector) as input and generates one or more sets of vertex deltas 117 (or an encoded/compressed representation thereof) as output. The machine-learning model 120 can include any suitable architecture for generating vertex deltas 117, including but not limited to a U-Net-based architecture, a convolutional neural network (CNN) architecture, a recurrent neural network (RNN) architecture, a fully connected neural network, combinations thereof, etc. Further details of example architectures for the machine-learning model 120 are described in connection with FIGS. 4A and 4B. The machine-learning model 120 can receive a sequence of audio data 112 (e.g., from a training/update example, from a recording during inference, etc.) as input. In some implementations, the machine-learning model 120 can include one or more audio encoder layers, which encode a window of raw audio data 112 to convert the audio data into a format that is compatible with subsequent machine-learning layers.

The machine-learning model 120 can also include one or more multilayer perceptron (MLP) layers that receive the style vector of the style data 114 (e.g., of a training example, or from an inference input) as input. The number of MLP layers that process the style vector can be a hyperparameter of the machine-learning model 120 that is specified via an internal configuration setting of the data processing system 102, or provided as part of a request (e.g., from an external computing system, via input to the data processing system 102, etc.) to generate/train/update the machine-learning model 120. The machine-learning model 120 can include one or more animation decoder layers, which may include CNN layers that receive and process the output of the audio encoder layer (or from a preceding CNN layer). In some implementations, the output of the MLP layers that process the style vector can be concatenated with the input of each animation encoder layer, such that each animation encoder layer processes the audio data 112 according to the input style data 114.

The model updater 118 can train/update the machine-learning model 120 to predict output vertex deltas 121 (e.g., a sequence of output vertex deltas 121) for a particular input style/identity, such that the output vertex deltas 121, when applied to a corresponding facial mesh (e.g., a character mesh, blended character mesh, common identity mesh, etc.), produce a speech animation for the facial mesh that is synchronized with spoken words or utterances in the audio data 112. The machine-learning model 120 can be trained/updated such that the output vertex deltas 121 cause the facial mesh to be warped to represent one or more identities specified via the style vector/input style data 114.

To do so, the model updater 118 can perform an iterative training/updating process that includes providing, for a given training/update example, the audio data 112 (or a portion thereof) and corresponding style data 114 (e.g., a style vector) as input, to the machine-learning model 120. The model updater 118 can propagate the input data through each layer of the machine-learning model 120 by performing the operations of the layer on the input data and passing the results of the computation as input to the next layer in the machine-learning model 120. The final layer in the machine-learning model 120 can produce a set of output vertex deltas 121 (or an encoded/compressed representation thereof).

The output vertex deltas 121 produced by the machine-learning model 120 for the training/update example can be compared to the ground truth vertex deltas 117 of the training/update example using a suitable loss function. The loss function may be any type of loss function, such as an L2 loss function. In some implementations, multiple examples of training/update data can be provided and applied to the machine-learning model 120, and the error between multiple sets of output vertex deltas 121 and the ground truth vertex deltas 117 of the multiple training/update examples can be used to calculate the loss value.

The model updater 118 can use the loss value calculated using the training/update data to update the weights of the machine-learning model 120, for example, using backpropagation or other types of optimization algorithms. The model updater 118 may perform multiple training/update iterations, each of which may include calculating a corresponding loss between an expected output of the machine-learning model 120 (e.g., the ground truth data) and an actual output of the machine-learning model 120. Various hyperparameters for the machine-learning model 120, and for the training/update process, may be provided to the model updater 118 in a request to train/update the machine-learning model 120 or from a stored configuration for training the machine-learning model 120.

In some implementations, a validation set, which can include one or more training/update examples, may be utilized to evaluate the performance of the machine-learning model 120 during the training/updating process. For example, the validation set may include a subset of the training/update data that is set aside from the training/update dataset and used to test/evaluate the accuracy of the machine-learning model 120. In a non-limiting example, the accuracy of the machine-learning model 120 may be tested/evaluated periodically (e.g., after predetermined numbers of training/updating examples have been used to train/update the machine-learning model 120, etc.). This process can be repeated until a training termination condition is reached, such as an accuracy threshold being met or upon using a predetermined number of training/updating examples to train/update the machine-learning model 120.

The machine-learning model 120 can be trained/updated, in one example implementation, to generate output vertex deltas 121 for a blended mesh. The blended mesh can be a mesh generated as a combination of the actor/character meshes in the character mesh data 108. The degree to which any given actor/character identity is reflected in the blended mesh can be specified via the style vector of the input style data 114. As described herein, the style vector can be a fixed-dimensional vector that defines a vector space within which any arbitrary number of identities can be represented/specified.

In another example implementation, the machine-learning model 120 can be trained/updated to generate output vertex deltas 121 for the common identity mesh 110. In such implementations, the identity/speaking style represented by the style data 114 provided as input to the model can cause the output vertex deltas 121 to warp the common identity mesh 110 to visually represent the specified identity/speaking style. In doing so, the machine-learning model 120 can be trained/updated using synthetic data derived from one or more speaking performances to generate output vertex deltas 121 for any arbitrary character/facial mesh.

Once trained/updated, the machine-learning model 120 can be stored and used to generate output vertex deltas 121 for arbitrary input audio data 112 and style data 114. In one example, the style data 114 can include one or more graphical sliders via which a user may provide input to select a degree to which a give identity and/or speaking style is represented in the output data. For example, the data processing system 102 may receive input audio data 112 and style data 114 indicating the particular speaking identities that are to be represented in the synchronized output. In response to the request, the data processing system 102 can generate an input style vector using the style data 114 and can provide the style vector and the audio data 112 as input to the machine-learning model 120 to generate output vertex deltas 121.

The input style data 114 provided to generate output vertex deltas 121 for a given input audio data 112 can be specified, in one example, using scalar values that each correspond to a respective identity. For example, the amount by which a particular identity is represented (e.g., in appearance/style of speaking) in the output vertex deltas 121 can be specified by a value ranging from zero to one, with zero indicating that the identity is not represented and one indicating that only that identity is represented. A respective identity/style value can be provided for each possible identity (e.g., each actor identity represented in the training/update data used to train the machine-learning model 120). In some implementations, when multiple identities are represented, the respective identity values can be scalar, decimal values that add up to 1.0 (or any other fixed value, such as 100, in some implementations), with each respective identity value indicating a percentage that the corresponding identity/speaking style is represented in the output vertex deltas 121.

In some implementations, the respective identity values for each identity/speaking style can be input to a graphical user interface via interactive user interface elements. The interactive user interface elements can be, in some implementations, slider bars, which enable a user to specify the relative proportions of each identity in a sample. The respective identity values provided by the user can be used to generate a corresponding style vector, which is provided as input to the machine-learning model 120 as described herein. Any suitable technique may be used to generate the style vector, including any type of coordinate/mapping technique to map the arbitrary number of style inputs to a fixed-dimension vector space.

In one example, four identities/actors are used to train/update the machine-learning model 120. Furthering this example, if a user provides respective identity values of 0.25 for the first identity, 0.25 for the second identity, 0.25 for the third identity, and 0.25 for the fourth identity, each of the four identities can be visually represented equally in the output vertex deltas 121. Furthering this example, if a user provides respective identity values of 0.0 for the first identity, 1.0 for the second identity, 0.1 for the third identity, and 0.0 for the fourth identity, only the second identity can be visually represented equally in the output vertex deltas 121, with each of the first, third, and fourth identities not being represented. If a user provides respective identity values of 0.25 for the first identity, 0.25 for the second identity, 0.5 for the third identity, and 0.0 for the fourth identity, the output vertex deltas 121 can visually presented the third identity as much as the first and second identities combined, with the fourth identity not being visually represented in the output vertex deltas 121.

The data processing system 102 can generate the output vertex deltas 121 by executing the machine-learning model 120 using the corresponding inputs, as described herein. For example, the data processing system 102 can provide the input audio data 112 and input style vector to the machine-learning model 120 and execute the operations at each layer of the machine-learning model 120 until the output vertex deltas are calculated. In some implementations, the data processing system 102 can perform a decoding process to decode/decompress the encoded output of the machine-learning model 120 (e.g., output vertex deltas 121 encoded via PCA, etc.). Once decoded, the animation generation process 122 can use the output vertex deltas 121 and one or more corresponding facial meshes (e.g., in the character mesh data 108, the common identity mesh 110, etc.) to generate an output animation 124.

To do so, the animation generation process 122 can retrieve the facial mesh(es) corresponding to the machine-learning model 120 to apply the output vertex deltas 121. For example, if the machine-learning model 120 is trained/updated to generate output vertex deltas 121 for a blended mesh (e.g., a combination of actor/character meshes in the character mesh data 108), the animation generation process 122 can access the neutral poses of each actor/character mesh in the character mesh data 108 to blend said meshes according to the input style data 114. In this example implementation, to blend the character meshes in the character mesh data 108, the data processing system 102 can perform a weighted average of the positions of corresponding vertices in each character/actor facial mesh, where the weight is specified via the respective identity value in the input style data 114.

Further the above example where four identities are used to train/update the machine-learning model 120, if the user specified a respective identity value of 1.0 for the second identity and 0.0 for the first, third, and fourth identities, the animation generation process 122 can generate the blended mesh such that only the second identity is represented. If the user specified a respective identity value of 0.5 for the first identity, 0.5 for the second identity, and 0.0 for the third and fourth identities, the animation generation process 122 can generate the blended mesh such that the neutral pose meshes of the first and second identities are represented equally (e.g., via averaging of the positions of each vertex), and the neutral meshes of the third and fourth identities are not represented.

Once the neutral pose blended mesh is generated, the animation generation process 122 can access the output vertex deltas 121 and apply the output vertex deltas 121 to the neutral pose of the blended mesh. As described herein, the output vertex deltas 121 may include a sequence of vertex deltas, where each item in the sequence provides positional transformations for each keyframe of an animation that is synchronized to the input audio data 112. The animation generation process 122 can iteratively apply each set of output vertex deltas 121 to the neutral pose of the blended mesh. Applying the output vertex deltas 121 can include modifying/warping/changing the positions of each vertex from its neutral pose position in the blended mesh. Applying the output vertex deltas 121 for a particular frame/portion of the audio of the animation causes generation of one or more keyframes of the output animation 124. The animation generation process 122 can repeatedly apply each set of output vertex deltas 121 generated via execution of the machine-learning model 121 to the neutral pose of the blended mesh to generate multiple, sequential keyframes of the output animation 124.

The animation generation process 122 can repeatedly provide portions of the input audio data 112 and the user-provided style data 114 as input to the machine-learning model 120 and applying the output vertex deltas 121 generated thereby to the neutral pose of the blended mesh, until all keyframes of the output animation 124 have been generated. Once the output animation 124 has been generated, the output animation 124 can be stored in association with the input data (e.g., the input audio data 112, the input style data 114, etc.). If the output animation 124 is generated in response to a request from a computing device (e.g., in a client-server relationship, etc.), the output animation 124 can be provided according to the computing system that provided the request. In some implementations, the output animation 124 can be stored in the storage 106 and/or the memory of the data processing system 102, such that the output animation 124 is accessible to the data processing system 102.

In another example implementation, the machine-learning model 120 is trained/updated to generate output vertex deltas 121 for the common identity mesh 110, where the respective identities of each actor/mesh are visually represented by the output vertex deltas 121 generated by the machine-learning model 120. In such implementations, the animation generation process 122 can access and retrieve a neutral pose of the common identity mesh 110. As described herein, the animation generation process 122 can access or otherwise receive input audio data 112 and style data 114 (e.g., respective identity input values) to generate the output animation 124 using the common identity mesh 110.

To do so, the animation generation process 122 can generate a style vector and iteratively provide portions the input audio data 112 and the style vector as input to the machine-learning model 120 trained/updated to generate output animations for the common identity mesh 110 (e.g., using the synthetic training/update data). Using the techniques described herein, the animation generation process 122 can generate and apply the output vertex deltas 121 to the neutral pose of the common identity mesh 110 to generate the output animation 124. As the identities/speaking styles are entirely visually represented (e.g., proportionally specified in the input style data 114, as described herein) via the output vertex deltas 121, the neutral pose of the common identity mesh is not necessarily blended or otherwise modified prior to deforming the common identity mesh 110 using the output vertex deltas 121.

The animation generation process 122 can repeatedly provide portions of the input audio data 112 and the user-provided style data 114 as input to the machine-learning model 120 and applying the output vertex deltas 121 generated thereby to the neutral pose of the common identity mesh, until all keyframes of the output animation 124 have been generated. Using the machine-learning model 120 trained/updated for the common identity mesh 110 enables application of a variety (or combination) of speaking identities to be applied to an arbitrary facial mesh, without requiring a specific actor to be scanned/provide a specific to generate the common identity mesh 110.

Figure 3:
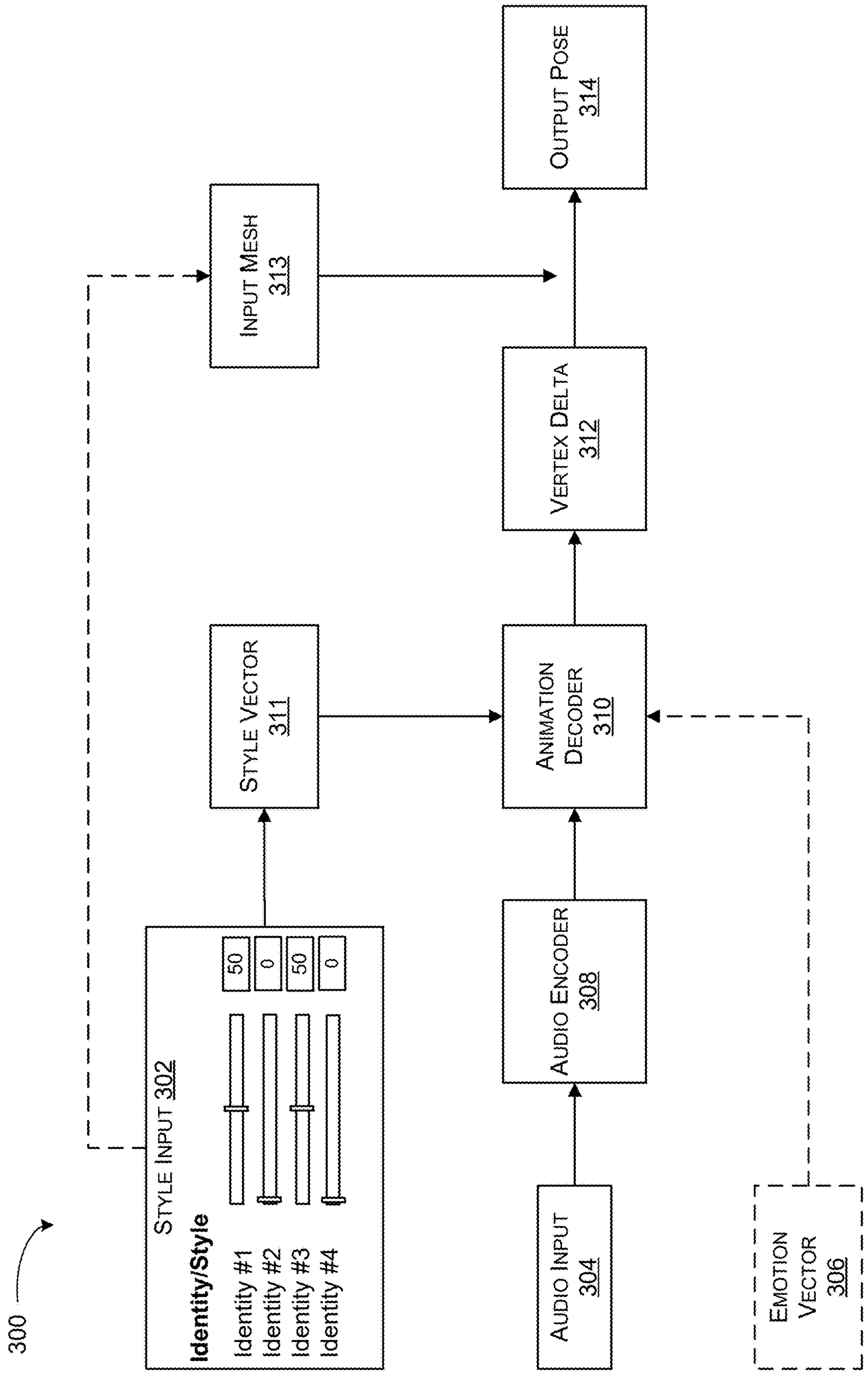
FIG. 3 is a data flow diagram showing the generation of an output pose using input style data, audio data, and emotion vector, in accordance with some embodiments of the present disclosure.

Referring to FIG. 3 in the context of the components described in connection with FIG. 1, illustrated is a dataflow diagram 300 showing the generation of an output pose/animation using an input style data 302, audio data 304, and emotion vector 306, in accordance with some embodiments of the present disclosure. The input style data 302 and the input audio data can be similar to, and include any of the structure and/or functionality of, the style data 114 and the audio data 112 described in connection with FIG. 1. As shown, the input audio data 304 is provided as input to one or more audio encoder layers 308 of a machine-learning model (e.g., the machine-learning model 120). In this example, the machine-learning model includes one or more audio encoder layers 308 and one or more animation decoder layers 310, as shown.

The one or more audio encoder layers 308 can be trained/updated (as part of training/updating the machine-learning model) to receive one or more portions (e.g., windows) of the audio data 304 as input, and can generate one or more audio features (e.g., a feature vector) as output. The audio feature vector is then provided as input to the one or more animation decoder layers 310. In this example, the style input 302 is shown with a corresponding portion of a graphical user interface, indicating respective proportions of identities (e.g., different actors) that were used to train/update the machine-learning model. In some implementations, the illustrated graphical user interface may be provided via one or more application interfaces, web-based interfaces, or the like. As shown, this example implementation utilized data from four different actors/identities to train/update the machine-learning model, and therefore the graphical user interface for the style input 302 includes four corresponding user interface elements that enable selection of respective identity input values. Any animations generated according to the techniques described herein may be presented via the same or a similar graphical user interface of an application, in some implementations.

In the illustrated example, both the first identity and the third identity of are selected to be equally represented in the output of the machine-learning model, while the second and fourth identities are selected not to be represented in the output. Although four identities are shown here, it should be understood that any number of identities (e.g., actor performances) can be used to train/update the machine-learning model and subsequently used to generate output animation data for given input audio. Further, it should be understood that any suitable proportion of the selectable identities can be selected or otherwise utilized to generate the output animations, according to the techniques described herein.

In some implementations, the respective identity values of the style input 302 can be selected or otherwise provided in response to any suitable user input. In some implementations, one or more large language models (LLMs) and/or vision language models (VLMs) can, at least in part, generate the style input 302. For example, a user may provide an input prompt to an LLM that requests generation of a synchronized lip-synch animation according to a particular actor/character or combination of actors/characters. Upon execution using said input prompt, the LLM/VLM can generate output data including respective identity values for the style input 302. Various other inputs to the machine-learning models described herein may be selected or otherwise retrieved according to output of one or more LLMs/VLMs in response to corresponding prompts. For example, the output of an LLM/VLM may identify segments of audio data 304, emotion vectors 306, or one or more actor/character meshes (e.g., from the character mesh data 108) to warp or modify using the output vertex deltas 312, in some implementations.

The respective identity values selected as part of the style input 302 can be used to generate the style vector 311. As described herein, the style vector 311 can be a fixed-dimensional vector or other data structure that defines a fixed-dimensional space capable of specifying an arbitrary number of identities. The style vector 311 can be provided as input to the animation decoder 310. In some implementations, an emotion vector 306 can be provided as input to one or more of the animation decoder layers 310, in addition to the style vector 311. The emotion vector 306 can, in some implementations, be included in training/update examples for the machine-learning model.

The emotion vector 306 can include data for one or more emotions that are to be represented in the synchronized speech animation. When included in the update/training datasets described herein, the emotion vector 306 can indicate an emotion that the voice actor was instructed to use when uttering the speech that was captured in the input audio data (e.g., the audio data 112, the audio data 304). In some implementations, the emotion vector 306 can be a fixed-dimension vector similar to the style vector 311, which can include data for a single emotion label, such as "anger," or may include data for multiple emotions, such as "anger" and "sadness," as well as potentially relative weightings of those two emotions. These labels and/or weightings may have been provided to the voice actor initially, may have been determined after the speech was uttered, and/or may involve updated labels after hearing the speech that was uttered for an audio capture for a specific emotion, among other techniques. During the inference phase depicted in the dataflow diagram 300, the emotion vector 306 can be specified in a similar manner to the style input data 114, in some implementations.

As shown, the one or more animation decoder layers 310 receive the style vector 311, the output of the audio encoder 308, and in some implementations the emotion vector 306 as input and generate corresponding output vertex deltas 312 synchronized to the portion of the audio data 304. The output vertex deltas 312 can be similar to, and include any of the structure and/or functionality of, the output vertex deltas 121 described in connection with FIG. 1. The output vertex deltas 312 can be applied to the input mesh 313 to produce one or more output poses 314. As described herein, the input mesh 313 can be generated as a blended facial mesh from multiple actor/character meshes (e.g., the character mesh data 108) based on the individual identity values provided via the style input 302. In some implementations, the input mesh 313 can be a common identity mesh (e.g., the common identity mesh 110), which can have a neutral pose that is not generated or modified based on the style input 302. Examples showing how the style vector is provided to the machine-learning model for a blended identity mesh and a common identity mesh are provided in FIGS. 4A and 4B, respectively.

Figure 4A:
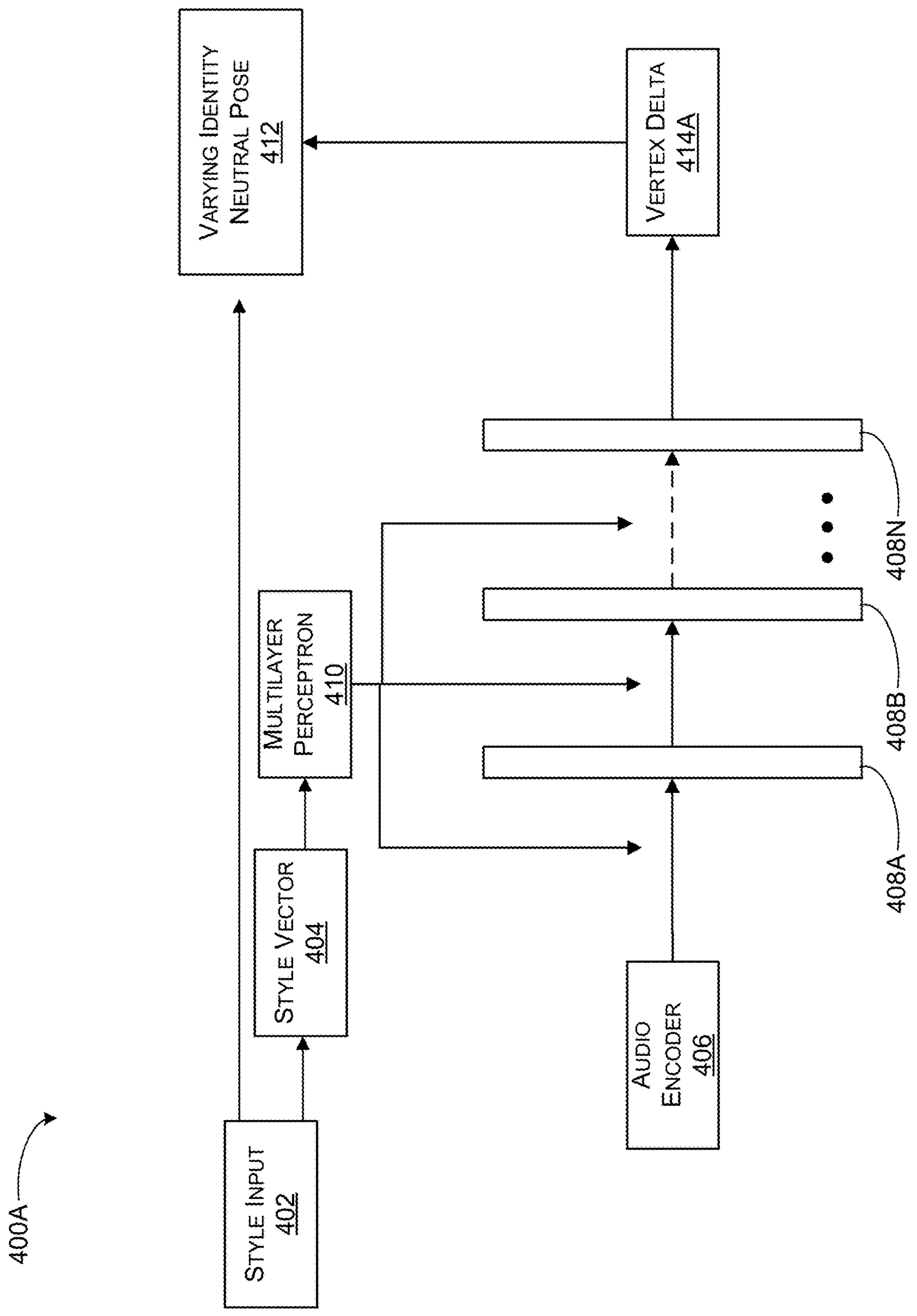
FIGS. 4A and 4B are example block diagrams shown example architectures of example animation decoder models, in accordance with some embodiments of the present disclosure.
Figure 4B:
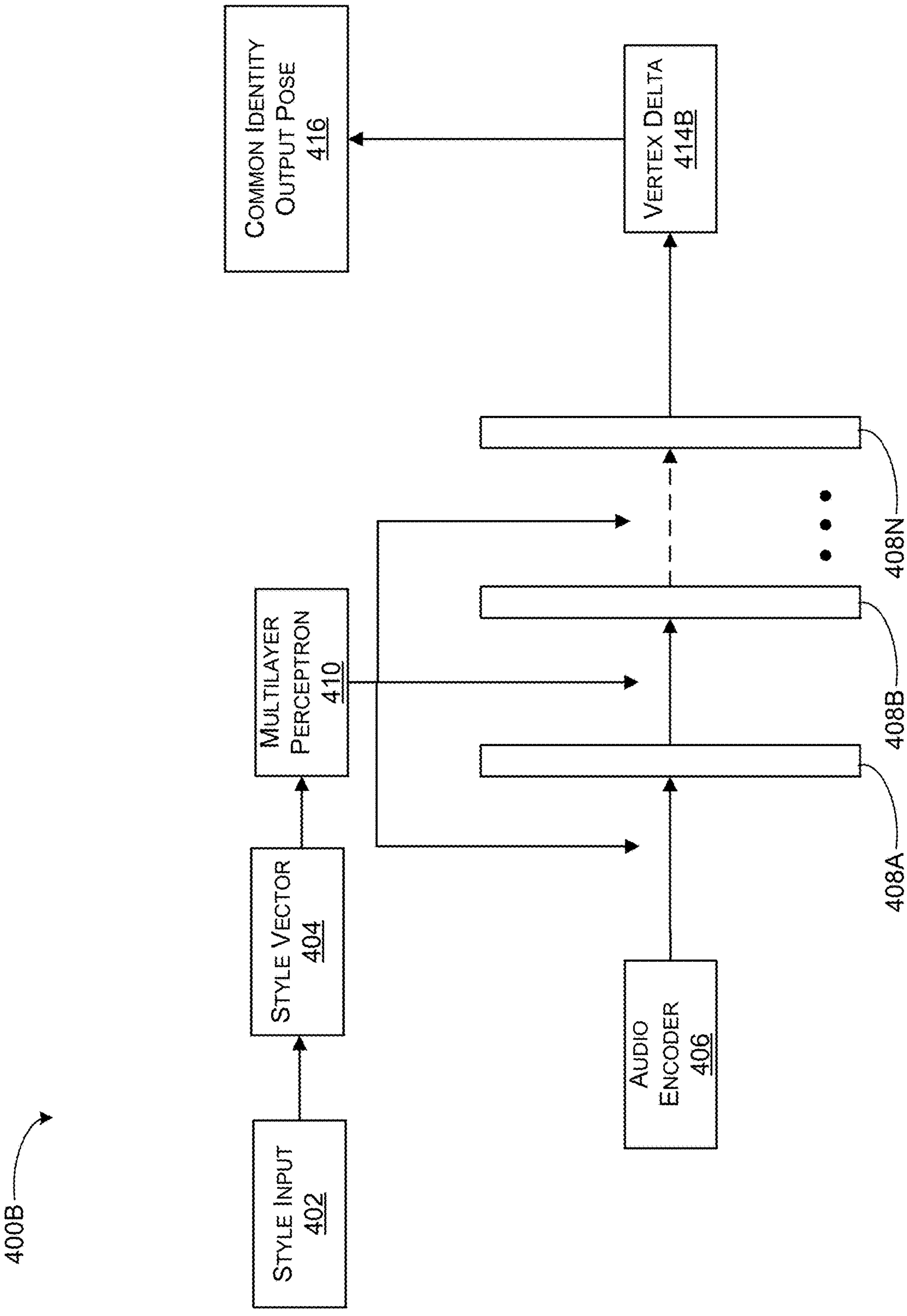

Referring to FIGS. 4A and 4B, illustrated are example block diagrams 400A and 400B showing example architectures of example machine-learning models that are trained/updated to generate output vertex deltas, in accordance with some embodiments of the present disclosure. In FIG. 4A, the block diagram 400A shows an example implementation of the machine-learning model that generates vertex deltas 414A that are applied to a varying/blended identity pose 412 as output to generate a synchronized animation. As shown, the style vector 404 is provided as input to one or more MLP layers 410, which are trained in connection with the animation decoder layers 408A-408N (sometimes referred to as the "animation decoder layer(s) 408") of the machine-learning model. As shown, the MLP layers 410 provide an output vector/data structure that is concatenated with the input of each of the animation decoder layers 408A-408N.

Although only three animation decoder layers 408A-408N are shown here, it should be understood that the machine-learning models described herein can include any number of animation decoder layers 408. As shown, the sequence of animation decoder layers 408 receive the output of the audio encoder 406, propagating data through each layer of the model, ultimately generating a set of output vertex deltas 414A as output. The output vertex deltas 414A can be similar to, and include any of the structure or functionality of the output vertex deltas 121 described in connection FIG. 1. As the output of the machine-learning model shown in FIG. 4A is a blended/varying identity animation, the style input 402 (which may be similar to the style input 302 of FIG. 3) is used to generate a blended neutral mesh upon which the output vertex deltas 414A are applied, as described herein. The machine-learning model can be executed to generate keyframes of animations for any length of audio data, and for any combination of styles. In some implementations, instructions can be provided to vary the style input 402 between keyframes, such that the output appears to change identities/speaking styles during the animation.

FIG. 4B shows an example diagram 400B showing how an example implementation of a machine-learning model that generates output vertex deltas 414B for a common identity mesh (e.g., the common identity mesh 110). In the example implementation shown in the diagram 400B, the common identity output pose 416 is generated by applying the output vertex deltas 414B to a neutral pose common identity mesh. As the neutral pose of the common identity mesh is only modified by the output vertex deltas 414B, the neutral pose of the common identity mesh is not generated using the input style data 402. Instead, the output vertex deltas 414B cause the neutral pose of the common identity mesh to be warped to visually represent the identities selected in the style input 402, as described herein.

This enables any identity/speaking style, or combination of identities/speaking styles, to be mapped to an arbitrary common identity mesh (e.g., any suitable character/facial mesh) for which the machine-learning model was trained/updated. As described herein, the respective identity values of the style input 402 (or emotion vector) can be varied for different portions of the input audio data, causing identity visually represented on the common identity output pose 416 to vary over the course of an audio sample.

Although FIGS. 4A and 4B are not shown as including an emotion vector, it should be understood that the one or more animation decoder layers 408 of the machine-learning models shown in the diagrams 400A and 400B may additionally receive the emotion vector (e.g., the emotion vector 306 of FIG. 3) as input. For example, the emotion vector may be concatenated with the style vector 404 and the input of each the one or more animation decoder layers 408, in some implementations.

Figure 5:
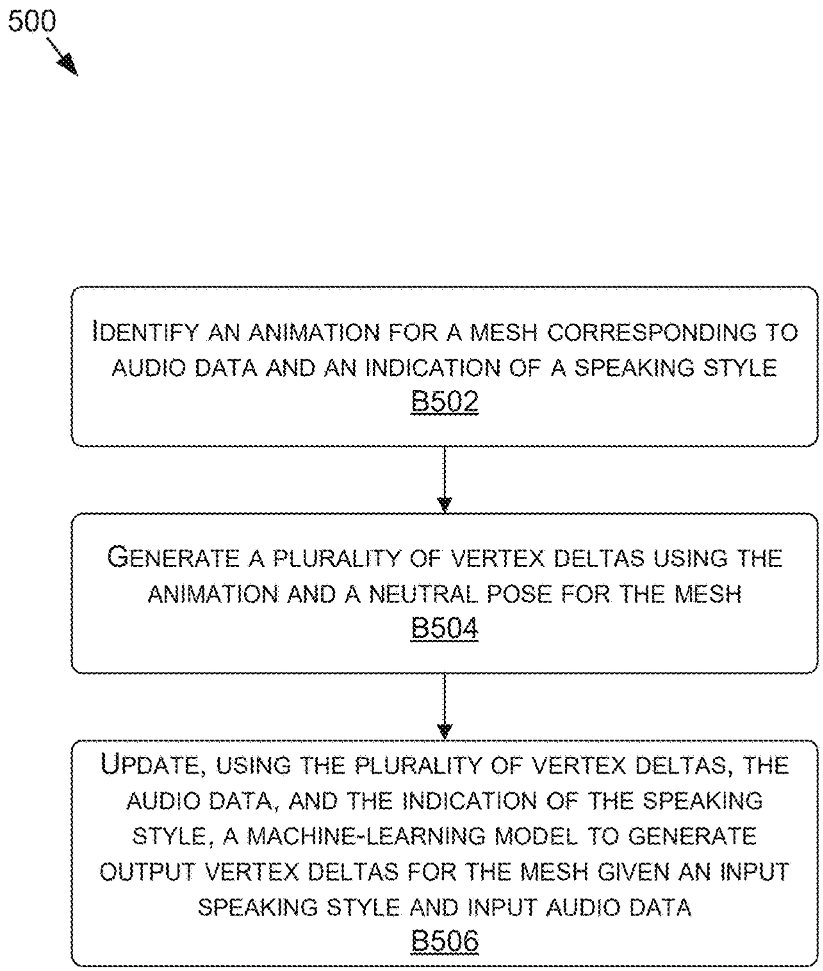
FIG. 5 is a flow diagram of an example of a method for audio-driven facial animation to implement varying identities and speaking styles, in accordance with some embodiments of the present disclosure.

FIG. 5 is a flow diagram showing a method 500 for audio-driven facial animation to implement varying identities and speaking styles, in accordance with some embodiments of the present disclosure. Various operations of the method 500 can be implemented by the same or different devices or entities at various points in time. For example, one or more first devices may implement operations relating to configuring (e.g., updating or training) neural networks (e.g., machine-learning models that generate vertex deltas for output animations synchronized to audio input) and other machine learning models, and one or more second devices may implement operations relating to executing said machine-learning models to generate animations for given audio input and identity/speaking style input. The one or more second devices may maintain the machine-learning models, or may access the machine-learning models using, for example and without limitation, APIs provided by the one or more first devices.

Each block of method 500, described herein, includes a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the systems of FIG. 1 and FIGS. 2-4B. However, this method 500 may additionally or alternatively be executed by any one system, or any combination of systems, including, but not limited to, those described herein.

The method 500, at block B502, includes identifying an animation for a mesh (e.g., one or more character meshes 108, etc.) corresponding to audio data (e.g., the audio data 112) and an indication of a speaking style (e.g., the style data 114). The audio data and mesh can be captured from an actor/character performance, as described herein. The indication of the speaking style can be an indication of the identity of the actor/character. In some implementations, a style vector (e.g., the style vector 311) is generated based at least on the indication of the speaking style. Multiple meshes, corresponding audio data, and speaking style data can be identified from multiple actor performances, which can be used to generate a robust training/update dataset for a machine-learning model, as described herein.

The method 500, at block 504, includes generating a plurality of vertex deltas using the animation and a neutral pose for the mesh. The vertex deltas can be extracted for each keyframe in the animated mesh by subtracting the positions of the vertices of the mesh at the frame from the positions of the vertices of the corresponding mesh in a neutral pose. The vertex deltas can be generated and utilized as ground-truth data in a training/update process for the machine-learning model(s) described herein. In some implementations, vertex deltas can be generated for each keyframe of the animation (or set of keyframes in the animation, in some implementations). The sets of vertex deltas for an animation can be stored in association with the corresponding audio data and the indication of the speaking style/identity in a training/update dataset.

The method 500, at block 506, includes updating, using the plurality of vertex deltas (e.g., the vertex deltas 117), the audio data, and the indication of the speaking style, a machine-learning model (e.g., the machine-learning model 120) to generate output vertex deltas (e.g., the output vertex deltas 121) for the mesh given an input speaking style and input audio data. The machine-learning model can include any number of neural network layers. In some implementations, the machine-learning model can include an audio encoder layer that generates an audio feature vector from at least a window of the input audio data. The machine-learning model can include one or more animation decoder layers.

The machine-learning model can include one or more MLP layers that receive the style vector as input. The output of the MLP layers can be concatenated with the input of each animation decoder layer, such that each animation decoder layer processes both input data and the speaking style/identity data encoded in the style vector. Updating the machine-learning model can include iteratively propagating the audio data and the indication of the speaking style (e.g., the style vector) of each training/update example through the machine-learning model to generate output vertex deltas. The output vertex deltas can be compared to the vertex deltas generated in step B504 (e.g., as ground-truth data) to calculate a loss value. The loss value can be used to update the trainable/updatable parameters of the machine-learning model to train/update the machine-learning model to generate output vertex deltas, as described herein.

In some embodiments, the systems and methods described herein may be implemented in one or more applications that provide graphical user interfaces to generate or manipulate facial animations for 3D characters (e.g., NVIDIA's Audio2Face). For example, graphical user interface elements (e.g., the sliders for the style input data 302) can be used to specify attributes (e.g., speaking style), audio samples, or facial meshes for use in generating facial animations according to the techniques described herein. The animations generated using these techniques may be implemented in 3D simulation applications, video game software (e.g., NVIDIA GeForce NOW, generating dynamic and/or customizable characters, etc.), and/or other 3D applications, including real-time applications.

In some embodiments, these 3D character animations may be generated or managed within a 3D content collaboration platform (e.g., NVIDIA's OMNIVERSE). In some embodiments, the content collaboration platform or system may include a system for using or developing universal scene descriptor (USD) (e.g., OpenUSD) data for managing characters, animations, and/or scenes relating to generated facial animations. The platform may be integrated with rendering software, which may include ray-tracing capabilities (e.g., NVIDIA's RTX rendering technologies) to render facial animations in simulated scenes, software applications, and/or remote gaming applications. The content platform may be integrated with software for training/updating machine-learning models (e.g., neural networks), including systems that generate synthetic training data using the facial animations described herein.

The platform may include or be integrated with software that creates or deploys virtual, interactive avatars (e.g., NVIDIA Avatar Cloud Engine (ACE)) for use in virtual scenes or video games. The techniques described herein may be used to animate realistic human animations, for example, as part of a platform or suite of software to implement highly realistic, interactive human models (e.g., NVIDIA's Digital Human Technology (DHT) software). Further implementations of the techniques described herein may be integrated with video conferencing applications (e.g., to animate virtual avatars of speakers in real-time), general 3D animation applications, virtual assistant applications (including healthcare assistants, customer service applications, etc.), robotics applications (e.g., to animate a face or character model on a robot display), automotive applications such as a virtual in-vehicle assistant (e.g., NVIDIA's DriveIX platform), and/or in combination with other generative machine-learning platforms. For example, the techniques described herein may be integrated in one or more large language model (LLM) or video language model (VLM) pipelines, to automatically generate animations for generated audio data or generated text data (e.g., converted to audio data using suitable text-to-speech software).

Example Content Streaming System

Figure 6:
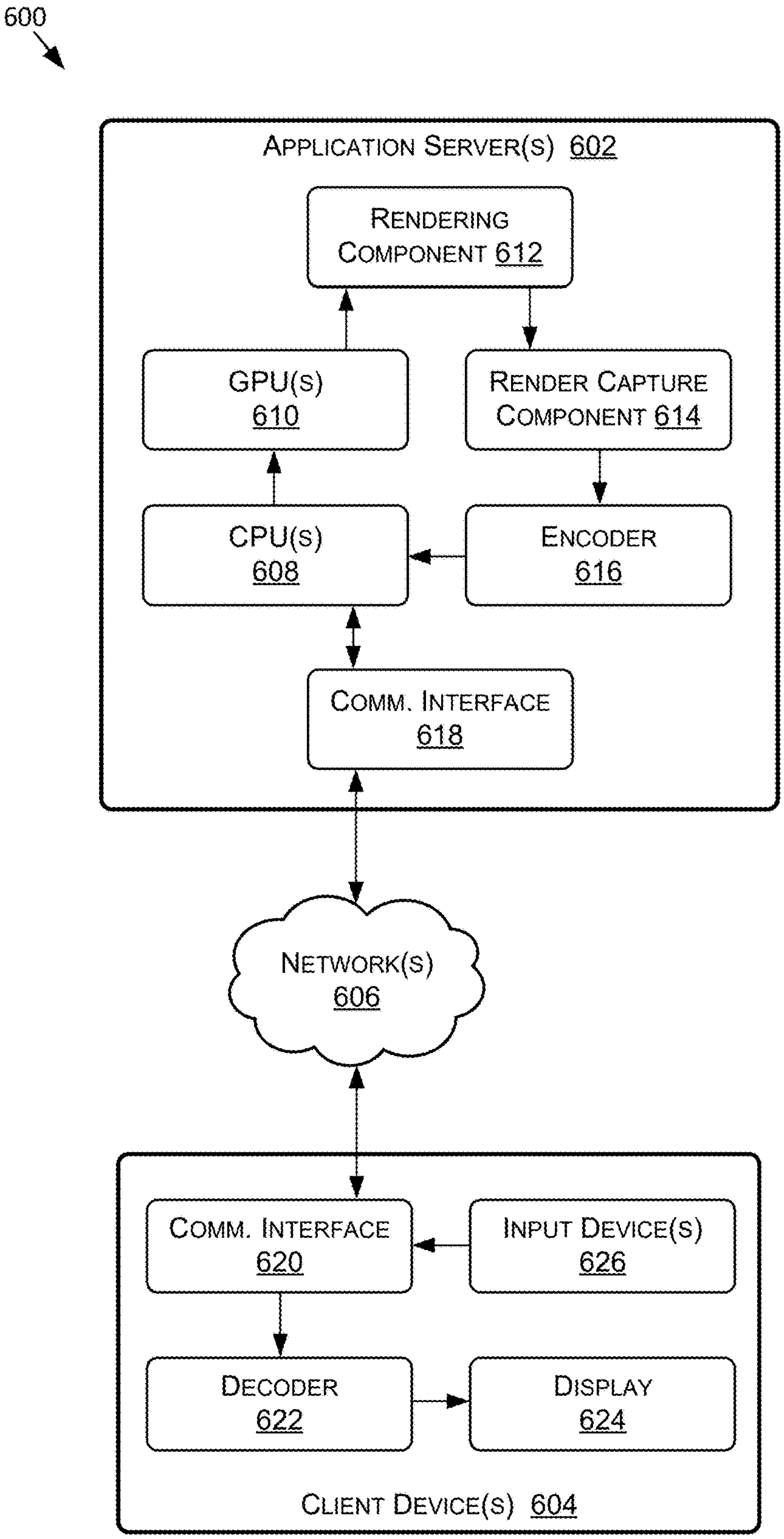
FIG. 6 is a block diagram of an example content streaming system suitable for use in implementing some embodiments of the present disclosure.

Now referring to FIG. 6, is an example system diagram for a content streaming system 600, in accordance with some embodiments of the present disclosure. FIG. 6 includes application server(s) 602 (which may include similar components, features, and/or functionality to the example computing device 700 of FIG. 7), client device(s) 604 (which may include similar components, features, and/or functionality to the example computing device 700 of FIG. 7), and network(s) 606 (which may be similar to the network(s) described herein). In some embodiments of the present disclosure, the system 600 may be implemented to generate audio-driven facial animations with varying identities and speaking styles, including techniques train/update the various machine-learning models described herein. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 600 can be implemented to receive input indicating one or more features of output to be generated using a neural network model, provide the input to the model to cause the model to generate the output, and use the output for various operations including display or simulation operations.

In the system 600, for an application session, the client device(s) 604 may only receive input data in response to inputs to the input device(s) 626, transmit the input data to the application server(s) 602, receive encoded display data from the application server(s) 602, and display the display data on the display 624. As such, the more computationally intense computing and processing is offloaded to the application server(s) 602 (e.g., rendering—in particular ray or path tracing—for graphical output of the application session is executed by the GPU(s) of the application server(s) 602). In other words, the application session is streamed to the client device(s) 604 from the application server(s) 602, thereby reducing the requirements of the client device(s) 604 for graphics processing and rendering.

For example, with respect to an instantiation of an application session, a client device 604 may be displaying a frame of the application session on the display 624 based at least on receiving the display data from the application server(s) 602. The client device 604 may receive an input to one of the input device(s) 626 and generate input data in response. The client device 604 may transmit the input data to the application server(s) 602 via the communication interface 620 and over the network(s) 606 (e.g., the Internet), and the application server(s) 602 may receive the input data via the communication interface 618. The CPU(s) 608 may receive the input data, process the input data, and transmit data to the GPU(s) 610 that causes the GPU(s) 610 to generate a rendering of the application session. For example, the input data may be representative of a movement of a character of the user in a game session of a game application, firing a weapon, reloading, passing a ball, turning on a vehicle, etc. The rendering component 612 may render the application session (e.g., representative of the result of the input data) and the render capture component 614 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 602. In some embodiments, one or more virtual machines (VMs)—e.g., including one or more virtual components, such as vGPUs, vCPUs, etc.—may be used by the application server(s) 602 to support the application sessions. The encoder 616 may then encode the display data to generate encoded display data and the encoded display data may be transmitted to the client device 604 over the network(s) 606 via the communication interface 618. The client device 604 may receive the encoded display data via the communication interface 620 and the decoder 622 may decode the encoded display data to generate the display data. The client device 604 may then display the display data via the display 624.

Example Computing Device

Figure 7:
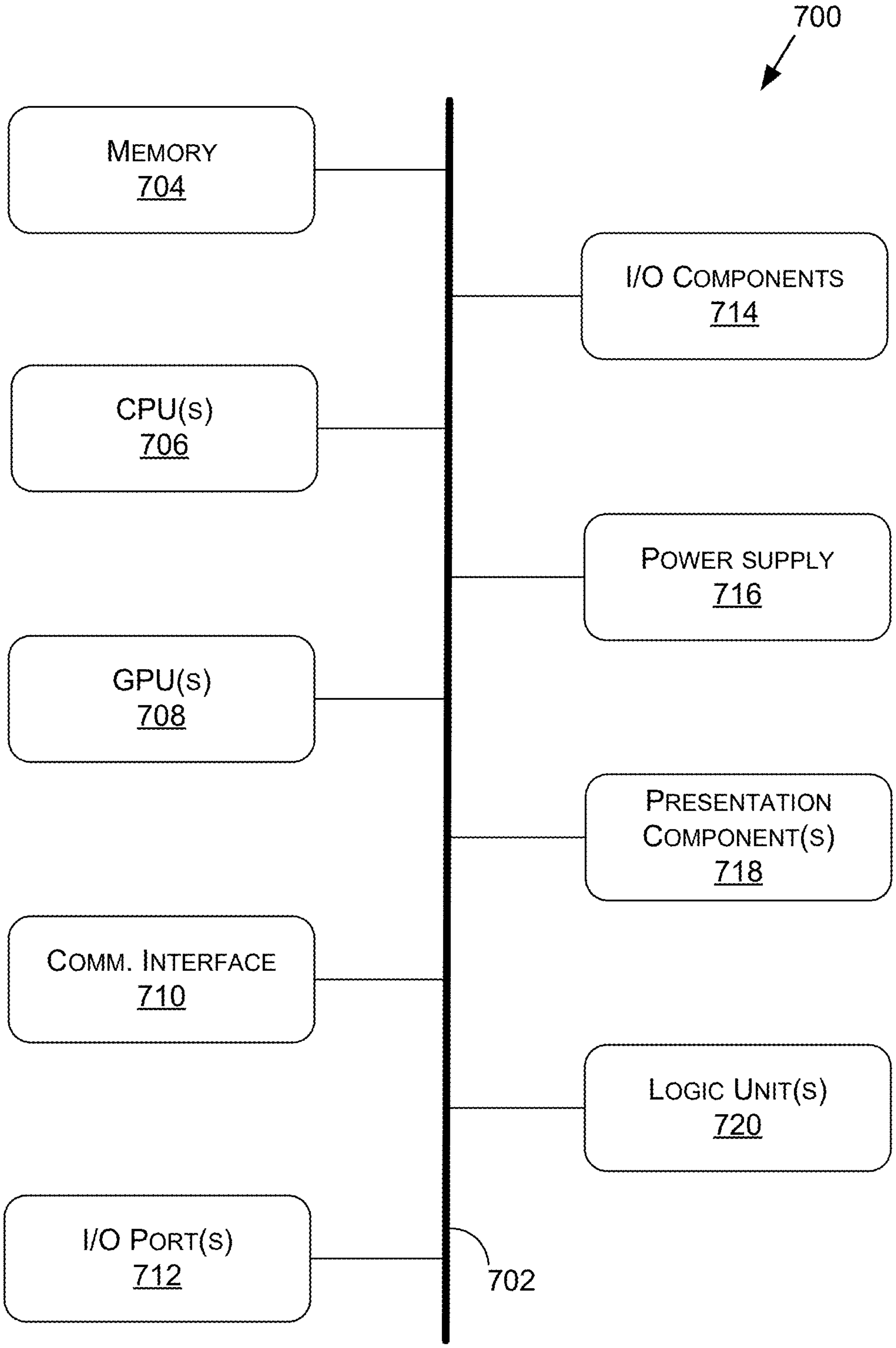
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may be arranged in various topologies, including but not limited to bus, star, ring, mesh, tree, or hybrid topologies. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU 708 may include its own memory or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that allow the computing device 700 to communicate with other computing devices via an electronic communication network, including wired and/or wireless communications. The communication interface 710 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708. In some embodiments, a plurality of computing devices 700 or components thereof, which may be similar or different to one another in various respects, can be communicatively coupled to transmit and receive data for performing various operations described herein, such as to facilitate latency reduction.

The I/O ports 712 may allow the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that allow detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to allow the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
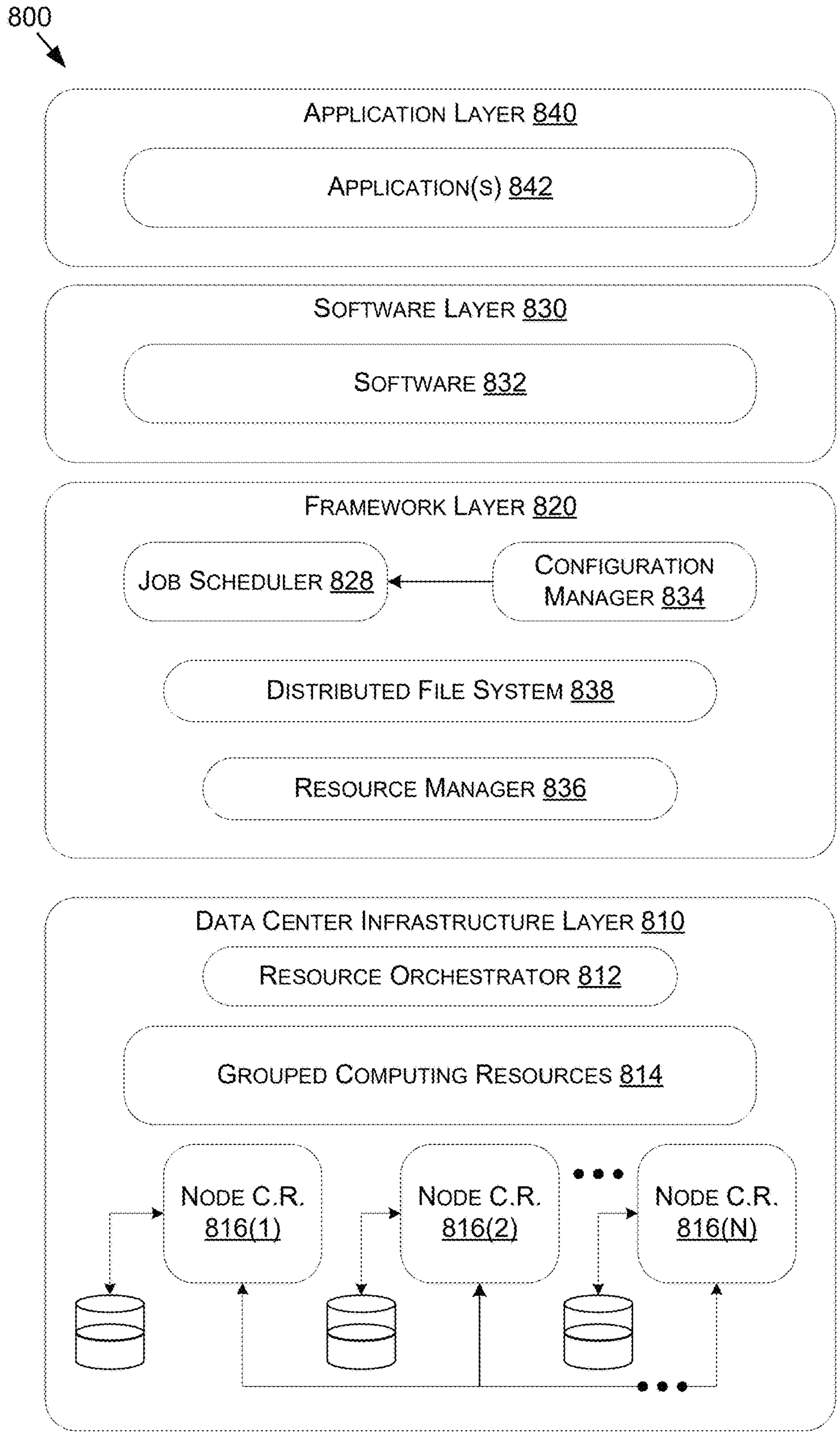
FIG. 8 is a block diagram of an example data center suitable for use in implementing some embodiments of the present disclosure.

FIG. 8 illustrates an example data center 800 that may be used in at least one embodiments of the present disclosure, such as to implement the systems 100, 200, or in one or more examples of the data center 800. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-1316(N), where "N" represents any whole, positive integer. In at least one embodiment, node C.R.s 816(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-1316(N) may correspond to a server having one or more of the above-mentioned computing resources. In addition, in some embodiments, the node C.R.s 816(1)-13161(N) may include one or more virtual components, such as vGPUs, vCPUs, and/or the like, and/or one or more of the node C.R.s 816(1)-1316(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-1316(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-1316(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-1316(N), grouped computing resources 814, and/or distributed file system 838 of framework layer 820. One or more types of applications may include, but are not limited to, any number of a genomics application, a cognitive compute, and a machine-learning application, including training or inferencing software, machine-learning framework software (e.g., PyTorch, TensorFlow, Caffe, etc.), and/or other machine-learning applications used in conjunction with one or more embodiments.

In at least one embodiment, any of configuration manager 834, resource manager 836, and resource orchestrator 812 may implement any number and type of self-modifying actions based at least on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software, or other resources to update/train one or more machine-learning models or predict or infer information using one or more machine-learning models according to one or more embodiments described herein. For example, a machine-learning model(s) may be updated/trained by calculating weight parameters according to a neural network architecture using software and/or computing resources described above with respect to the data center 800. In at least one embodiment, trained or deployed machine-learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to update/train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:

one or more circuits to:

identify an animation for a mesh corresponding to audio data and an indication of a speaking style;

generate a plurality of vertex deltas using the animation and a neutral pose for the mesh; and using the plurality of vertex deltas, the audio data, and the indication of the speaking style, update one or more parameters of a machine-learning model such that the machine-learning model generates output vertex deltas for the mesh given an input speaking style and input audio data.

2. The one or more processors of claim 1, wherein the one or more circuits are to:

generate the plurality of vertex deltas based at least on respective vertices in the mesh at a frame of the animation and corresponding vertices of the neutral pose for the mesh.

3. The one or more processors of claim 1, wherein the one or more circuits are to:

generate a style vector based at least on the indication of the speaking style; and update the one or more parameters of the machine-learning model based at least on the style vector.

4. The one or more processors of claim 1, wherein the one or more circuits are to:

execute the machine-learning model using second audio data and a second indication of a second speaking style to generate a set of vertex deltas for the mesh.

5. The one or more processors of claim 4, wherein the machine-learning model comprises a first layer and a second layer, and wherein the one or more circuits are to:

provide the second audio data as input to the first layer; and provide a second style vector generated from the second indication of the second speaking style as input to the second layer.

6. The one or more processors of claim 4, wherein the one or more circuits are to:

modify the mesh according to the set of vertex deltas to generate a transformed mesh that conforms to the second audio data.

7. The one or more processors of claim 1, wherein the mesh is a first mesh corresponding to a first identity, and wherein the one or more circuits are to:

generate a blended mesh based at least on the first mesh, a second mesh corresponding to a second identity, and the indication of the speaking style.

8. The one or more processors of claim 7, wherein the indication of the speaking style comprises a first weight value for the first identity and a second weight value of the second identity, and wherein the one or more circuits are to:

generate the blended mesh further based at least on the first weight value and the second weight value.

9. The one or more processors of claim 1, wherein the one or more circuits are to:

generate encoded data representing the plurality of vertex deltas; and update the machine-learning model further based at least on the encoded data.

10. The one or more processors of claim 1, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for performing generative AI operations using a large language model (LLM);

a system for performing generative AI operations using a vision language model (VLM);

a system for generating synthetic data;

a system incorporating one or more virtual machines (VMs);

a system implemented at least partially in a data center; or a system implemented at least partially using cloud computing resources.

11. A system comprising:

one or more processors to:

calculate a plurality of vertex deltas for a first mesh based at least on an animation of the first mesh and a neutral pose for the first mesh, the animation corresponding to audio data and a style vector;

map the plurality of vertex deltas to a second mesh to generate a plurality of mapped vertex deltas; and update one or more parameters of a machine-learning model using the audio data, the style vector, and the plurality of mapped vertex deltas, the machine-learning model to generate output vertex deltas for the second mesh given an input style vector and input audio data.

12. The system of claim 11, wherein the one or more processors are to generate a plurality of mapped vertex deltas by:

generating an updated second mesh by mapping the plurality of vertex deltas to the second mesh; and generating the plurality of mapped vertex deltas by mapping the updated second mesh from a neutral pose of the second mesh.

13. The system of claim 12, wherein the one or more processors are to generate the updated second mesh further based at least on a thin plat spline (TPS) function.

14. The system of claim 13, wherein the one or more processors are to generate the updated second mesh further based at least on a delta mush operation.

15. The system of claim 11, wherein the one or more processors are to:

generate an encoded data structure from the plurality of vertex deltas; and update the machine-learning model using the encoded data structure.

16. The system of claim 11, wherein the machine-learning model comprises one or more neural network layers.

17. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for performing generative AI operations using a large language model (LLM);

a system for performing generative AI operations using a vision language model (VLM);

a system for generating synthetic data;

a system incorporating one or more virtual machines (VMs);

a system implemented at least partially in a data center; or a system implemented at least partially using cloud computing resources.

18. A method, comprising:

identifying, using one or more processors, an animation for a mesh corresponding to audio data and an indication of a speaking style;

generating, using the one or more processors, a plurality of vertex deltas using the animation and a neutral pose for the mesh; and updating, using the one or more processors and based at least on the plurality of vertex deltas, the audio data, and the indication of the speaking style, one or more parameters of a machine-learning model to generate output vertex deltas for the mesh given an input speaking style and input audio data.

19. The method of claim 18, further comprising:

generating, using the one or more processors, the plurality of vertex deltas based at least on respective vertices in the mesh at a frame of the animation and corresponding vertices of the neutral pose for the mesh.

20. The method of claim 18, further comprising:

generating, using the one or more processors, a style vector based at least on the indication of the speaking style; and updating, using the one or more processors, the machine-learning model based at least on the style vector.

* * * * *